(12) United States Patent
Urick

(10) Patent No.: US 7,474,203 B2
(45) Date of Patent: Jan. 6, 2009

(54) SYSTEM FOR AUTOMATICALLY POSITIONING VEHICLE MIRRORS

(76) Inventor: Kirk B. Urick, 1113 Hawk Creek Dr., Blue Springs, MO (US) 64015

( * ) Notice: Subject to any disclaimer, the term of this patent is extended or adjusted under 35 U.S.C. 154(b) by 0 days.

(21) Appl. No.: 11/748,693

(22) Filed: May 15, 2007

(65) Prior Publication Data

US 2007/0211357 A1 Sep. 13, 2007

Related U.S. Application Data

(63) Continuation-in-part of application No. 10/986,266, filed on Nov. 10, 2004, now Pat. No. 7,224,265.

(60) Provisional application No. 60/518,817, filed on Nov. 10, 2003.

(51) Int. Cl.
*B60Q 1/00* (2006.01)

(52) U.S. Cl. ............ 340/436; 340/686.6; 340/426.12; 340/435; 359/841

(58) Field of Classification Search ............ 340/686.6, 340/825.72, 426.1, 426.12, 539.1, 435, 903; 307/10.2; 359/841, 843, 877; 362/494
See application file for complete search history.

(56) References Cited

U.S. PATENT DOCUMENTS

| | | | |
|---|---|---|---|
| 4,626,083 A | | 12/1986 | Nakayama |
| 5,477,210 A | | 12/1995 | Belcher |
| 5,497,273 A | * | 3/1996 | Kogita et al. ............ 359/843 |
| 5,640,281 A | * | 6/1997 | Cho ............ 359/841 |
| 5,818,330 A | * | 10/1998 | Schweiger ............ 340/426.13 |
| 6,204,753 B1 | * | 3/2001 | Schenk et al. ............ 340/435 |
| 6,265,974 B1 | | 7/2001 | D'Angelo et al. |
| 6,754,565 B2 | | 6/2004 | Horbelt |
| 6,847,288 B1 | * | 1/2005 | Baschnagel, III ........ 340/426.1 |
| 6,984,048 B2 | | 1/2006 | Yamabe |
| 7,360,908 B1 | * | 4/2008 | Duroux et al. ............ 359/841 |
| 2003/0026012 A1 | | 2/2003 | Pavao |
| 2003/0218812 A1 | | 11/2003 | Foote |
| 2004/0184170 A1 | | 9/2004 | Duroux |
| 2005/0040943 A1 | * | 2/2005 | Winick ............ 340/539.1 |
| 2006/0132282 A1 | | 6/2006 | McCall |

FOREIGN PATENT DOCUMENTS

| | | |
|---|---|---|
| EP | 0220606 | 9/1990 |
| GB | 2334499 | 8/1999 |

\* cited by examiner

*Primary Examiner*—George A Bugg
*Assistant Examiner*—Hoi C Lau
(74) *Attorney, Agent, or Firm*—Spencer Fane Britt & Browne LLP

(57) ABSTRACT

A system for automatically moving a vehicle's mirrors between open and closed positions in response either to a signal received from a remote transmitter or to an action normally taken in the ordinary course of operating the vehicle, and thereby avoiding damage to the mirror. The system includes the mirror, a motor for moving the mirror to the open and closed positions, and an onboard controller for automatically providing an actuation signal to the motor in response to the occurrence of an actuation condition which results from an action normally taken in the ordinary course of operating the vehicle. The system may also include the remote transmitter located in an area of close clearance to provide a signal which causes the onboard controller to provide the actuation signal.

17 Claims, 3 Drawing Sheets

SYSTEM FOR AUTOMATICALLY POSITIONING VEHICLE MIRRORS

RELATED APPLICATIONS

The present U.S. continuation-in-part patent application claims priority benefit of an earlier-filed U.S. non-provisional patent application titled AUTOMATIC REMOTE RETRACTABLE MIRRORS, Ser. No. 10/986,266, filed Nov. 10, 2004, now U.S. Pat. No. 7,224,265 which, in turn, claims priority benefit of an even earlier-filed U.S. provisional patent application titled A.R.R.M. (AUTOMATIC REMOTE RETRACTABLE MIRRORS)™, Ser. No. 60/518,817, filed Nov. 10, 2003. The identified earlier-filed patent applications are hereby incorporated by reference herein.

FIELD OF THE INVENTION

The present invention relates to moveable mirrors for vehicles, and, more specifically, concerns a system operable to substantially automatically move a vehicle's mirrors between open and closed positions in response either to a signal received from a remote transmitter or to an action normally taken in the ordinary course of operating the vehicle, and thereby avoid damage to the mirrors.

BACKGROUND OF THE INVENTION

It is often desirable to move one or more of a vehicle's mirrors from an open position, in which the mirror to extended, or "folded out", for normal use, to a closed position, in which the mirror is retracted, or "folded in", to avoid damage resulting from inadvertent physical contact with another object. This is true, for example, when entering a garage or "drive-through" which provides only minimal clearance to one or both sides of the vehicle. It is also true in parking lots where other vehicles or people moving between vehicles have only minimal separation. Furthermore, it is particularly desirable given available extended length mirrors for towing applications.

One option for accomplishing this movement of the mirrors is to manually, i.e., by hand, position the mirrors in the desired configuration, i.e., folded out or in. Unfortunately, implementing this option may require that the vehicle's operator leave the vehicle to reach the mirrors, which is not always possible or desirable. Furthermore, there always exists the risk that the operator may forget to position or reposition the mirrors, resulting in an inability to see trailing vehicles if the mirrors are left folded in or damage to the mirrors if the mirror are left folded out.

Another option for accomplishing this movement is to incorporate selectively actuatable motors into the mirrors so that the operator can position the mirrors by actuating the motors, such as by depressing a button or similar control. Unfortunately, there still exists the risk that the operator may forget to actuate the motors, resulting in damage to the mirrors.

In light of the foregoing problems and limitations, a need exists for an improved mechanism for controlling the positioning of a vehicle's mirrors.

SUMMARY OF THE INVENTION

The present invention overcomes the above-described problems and limitations in the prior art by providing a system operable to substantially automatically move a vehicle's mirrors between open and closed positions in response either to a signal received from a remote transmitter or to an action normally taken in the ordinary course of operating the vehicle, and thereby avoid damage to the mirror.

In one embodiment, the system comprises the mirror mounted on the vehicle, the mirror being movable between an open position and a closed position; a motor operable to, in response to an actuation signal, move the mirror to one of the open and closed positions; and an onboard controller operable to substantially automatically provide the actuation signal to the motor in response to the occurrence of an actuation condition, wherein the actuation condition is associated with an action normally taken in the ordinary course of operating the vehicle. The mirror may be mounted within a housing which includes a lower element fixedly mounted to the vehicle; and an upper element pivotably associated with the lower element. The action normally taken in the ordinary course of operating the vehicle may include first actions associated with beginning operation of the vehicle, indicating that the mirror should be moved to the open position; and second actions associated with ending operation of the vehicle, indicating that the mirror should be moved to the closed position. More specifically, the action normally taken in the ordinary course of operating the vehicle may involve inserting or removing a key or engaging or disengaging a transmission. The onboard controller may be further operable to substantially automatically provide the actuation signal when the vehicle enters a particular location as determined by global positioning system (GPS) technology.

The system may further comprise the remote transmitter located in an area of close clearance and operable to provide a signal which causes the onboard controller to provide the actuation signal. The remote transmitter may be a short range, directional, continuous transmitter. The remote transmitter may be adapted to plug into a common electrical outlet, such as are commonly found in residential garages. The remote transmitter may include a pre-settable distance control for controlling the distance from the area of close clearance at which the remote transmitter's signal is receivable by the onboard controller.

The system may further include a manually activated switch for causing the onboard controller to provide the actuation signal, the switch having at least three positions, including a position associated with a left mirror only; a position associated with a right mirror only; and a position associated with both the left and rights mirrors. The system may further include a manually activated key fob transmitter for remotely causing the onboard controller to provide the actuation signal.

From the discussion set forth herein, it will be appreciated by those with ordinary skill in the art that the system of the present invention provides a number of advantages over the prior art, including substantially automatically positioning the mirrors, rather than relying on the operator to remember to do so, in response to a condition in which the mirrors might be damaged. In turn, this allows for mounting larger mirrors or extension mirrors as needed and without constant fear of damage.

These and other features of the present invention are described in more detail in the section titled DETAILED DESCRIPTION OF THE INVENTION, below.

BRIEF DESCRIPTION OF THE DRAWINGS

The present invention is described herein with reference to the following drawing figures.

DETAILED DESCRIPTION OF THE INVENTION

Figure 1:
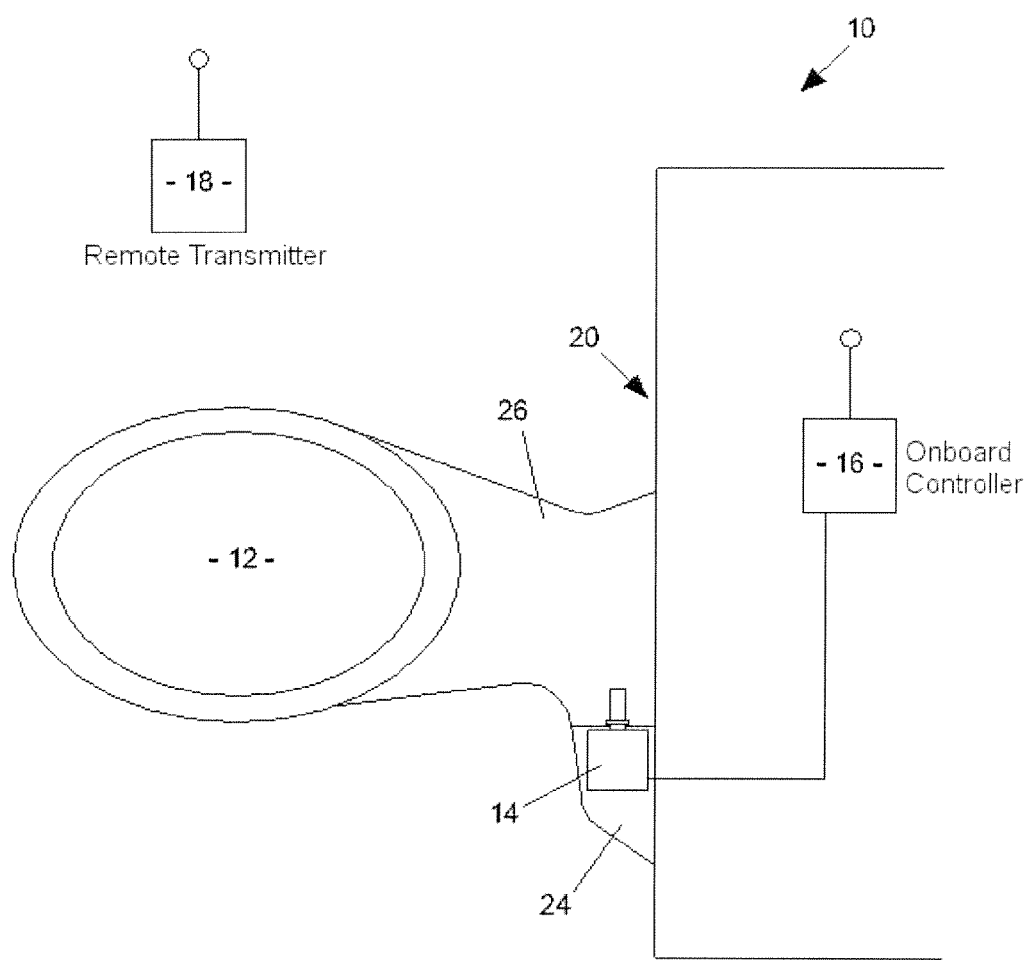
FIG. 1 is a depiction of a preferred embodiment of the system of the present invention for repositioning a vehicle's mirrors.
Figure 2:
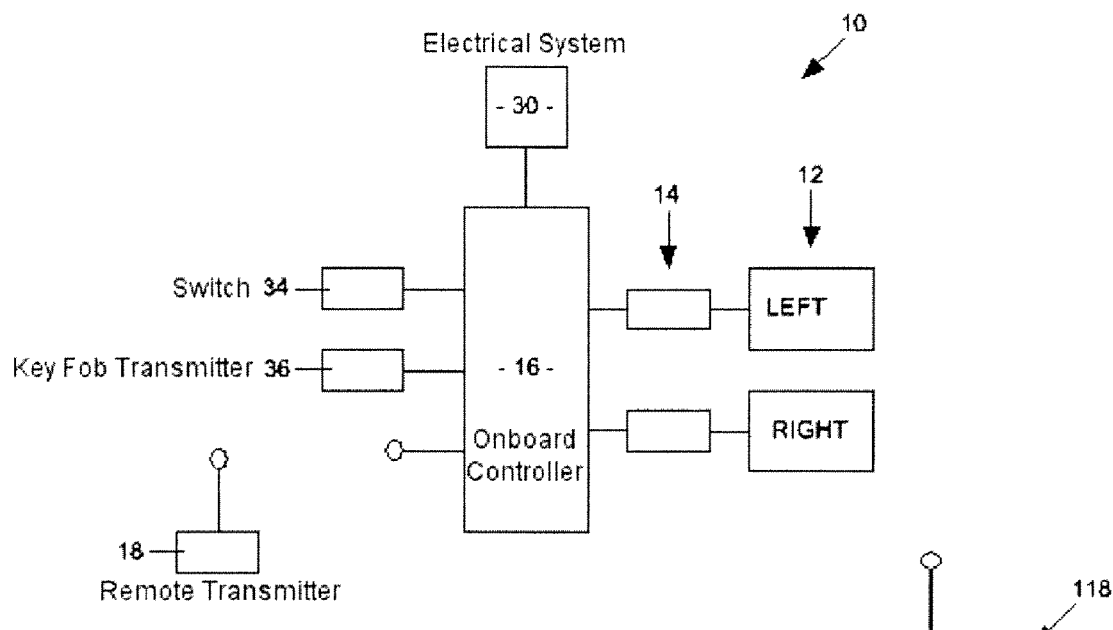
FIG. 2 is a block diagram showing various components of the system of FIG. 1.

With reference to the figures, the present invention is herein described, shown, and disclosed in accordance with one or more preferred embodiments. Broadly, the present invention concerns a system 10 operable to substantially automatically move a vehicle's mirrors 12 between closed and open positions in response either to a signal received from a remote transmitter 18 or to an action normally taken in the ordinary course of operating the vehicle 20, and thereby avoid damage to the mirrors 12. Referring to FIGS. 1 and 2, one embodiment of the system 10 broadly comprises the mirror 12; a motor 14; an onboard controller 16; and the remote transmitter 18. As shown in FIG. 2, it will be appreciated that, for most vehicles, the system 10 will include two mirrors 12, i.e., left and right, and two corresponding motors 14 which will be substantially identical in structure and operation. Thus, it will be understood that the singular term "mirror", as used herein, shall refer to either mirror or both mirrors, depending on context, unless otherwise expressly stated.

The mirror 12 may be an otherwise substantially conventional vehicle mirror used by drivers to see what is occurring behind or to the side of them. The mirror 12 may include, as part of its housing, a lower element 24 which is fixedly mounted to the vehicle 20, and an upper element 26 which is pivotably associated with the lower element 24. The mirror 12 may further include a tension spring interposed between the lower and upper elements 24,26 to better control the motion and positioning of the mirror 12.

The motor 14 may be an otherwise conventional electric motor, such as a DC stepper motor. The motor 14 is mechanically connected directly or indirectly, such as by a linkage, to the mirror 12, and operable, in response to an actuation signal, to move the mirror 12 to an alternate position. More specifically, if the mirror 12 is in the open, or "folded out", position when the actuation signal is received, then the motor 14 moves the mirror to the closed, or "folded in", position. Similarly, if the mirror 12 is in the closed position when the actuation signal is received then the motor 14 moves the mirror to the open position.

The onboard controller 16 is operable to provide the actuation signal for actuating the motor 14 in response to the occurrence of an actuation condition. The actuation signal provided by the onboard controller 16 may be generated by the onboard controller 16 in response to an actuation condition associated with an action normally taken in the ordinary course of beginning or ending operation of the vehicle 20. Such action may include, for example, inserting or removing the vehicle's key or placing the vehicle's transmission into drive or park. More specifically, an action ordinarily taken in the course of beginning operation of the vehicle 20 would indicate that the mirror 12 should be moved to the open position, while an action ordinarily associated with ending operation of the vehicle 20 would indicate that the mirror 12 should be moved to the closed position. The onboard controller 16 is also operable to provide the actuation signal in response to a signal received from the remote transmitter 18.

The onboard controller 16 and the motor 14 receive power from the vehicle's electrical system 30.

In one embodiment, the onboard controller 16 is further operable to provide the actuation signal when the vehicle 20 approaches or enters a particular location. The vehicle's location may be determined by onboard global positioning system (GPS) technology, which is incorporated into or accessed by the system 10, or by a remote entity in communication with the system 10. The locations which trigger this feature may include shopping mall parking lots, sports stadium parking lots, airport parking lots, university parking lots, and other locations associated with close clearances and possible damage to the mirror 12.

In one embodiment, the onboard controller 16 is provided by an existing onboard controller. More specifically, certain existing services, such as the well-known ONSTAR® service, allow for remotely controlling certain actions, e.g., unlocking doors, in a vehicle equipped with an onboard controller operable to receive instructions via wireless communication and, in response thereto, accomplish the actions. It is contemplated that such an existing onboard controller may be adapted to also function as the onboard controller 16 of the present invention. Such adaptation is considered to be within the abilities of one with ordinary skill in the art without requiring undue experimentation.

The remote transmitter 18 is operable to provide a signal indicating a special condition, not directly associated with operation of the vehicle, in light of which it is advisable to change the position of the mirror 12. In one embodiment, the remote transmitter 18 is a short range, directional, continuous transmitter. For example, a carwash, drive-through, or garage with relatively close clearance may include the remote transmitter 18 mounted in such a position that its signal is received at the vehicle 20 as it approaches or enters the area of close clearance. The onboard controller 16 receives this signal and provides the actuation signal for actuating the motor 14. In various embodiments, a second remote transmitter may be provided to transmit a signal to the vehicle leaving the area of close clearance to return the mirror 12 to its open position, or the system 10 may be configured so that the mirror 12 returns to its open position as soon as or some measured period after the signal from the remote transmitter 18 is no longer received.

Figure 3:
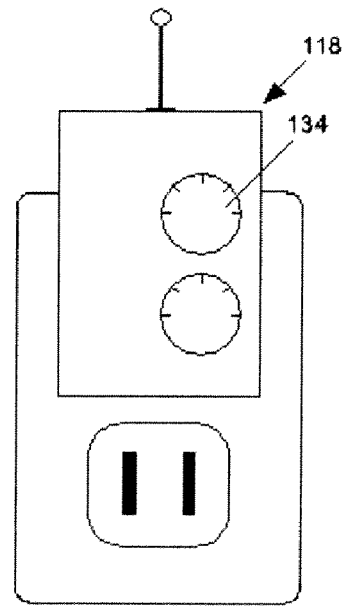
FIG. 3 is a depiction of a remote transmitter component of the system of FIG. 1.

Referring also to FIG. 3, in one embodiment, the remote transmitter 118 takes the form of a unit adapted to plug into a common electrical outlet, such as are found in many residential garages. The remote transmitter 118 may include controls for controlling its operation, including a settable distance control 134 for controlling the distance from the remote transmitter 118 at which the remote transmitter's signal is receivable by the onboard controller 16, e.g., the distance from the garage at which the mirror 12 repositions.

In various embodiments, the system 10 may further include a manually-activated switch 34 for causing the onboard controller 16 to reposition the mirror 12 whenever desired, such as when driving through an area of close clearance which is not provided with the remote transmitter 18 for substantially automatically repositioning the mirror 12. In one embodiment, the switch is a four-position switch, with positions corresponding to the left mirror only, the right mirror only, both mirrors, and "off". The switch 34 is in communication with the onboard controller 16, such that moving the switch 34 results in a signal being sent to the onboard controller 16, which, in turn, results in the actuation signal being sent to the corresponding mirror 12. In one embodiment, automatic operation of the system 10 will override manual operation, while in another embodiment, manual operation of the system 10 will override automatic operation.

In a similar embodiment, the system 10 may further include a manually-activated key fob transmitter 36 for causing the onboard controller 16 to reposition the mirror 12 from a distance whenever desired, such as when moving away from or toward the vehicle 20. The key fob transmitter 36 may be substantially similar to the switch 34 is operation.

In one embodiment, the system 10 may further include one or more indicators, such as LEDs, for indicating whether the other components of the system 10 are working properly. For example, the indicators may include a green LED which, when lit, indicates proper operation, and a red LED which, when lit, indicates some problem with the system 10. This allows the operator of the vehicle to quickly determine whether he or she can rely on the system 10 to properly position the mirror 12 when needed.

Figure 4:
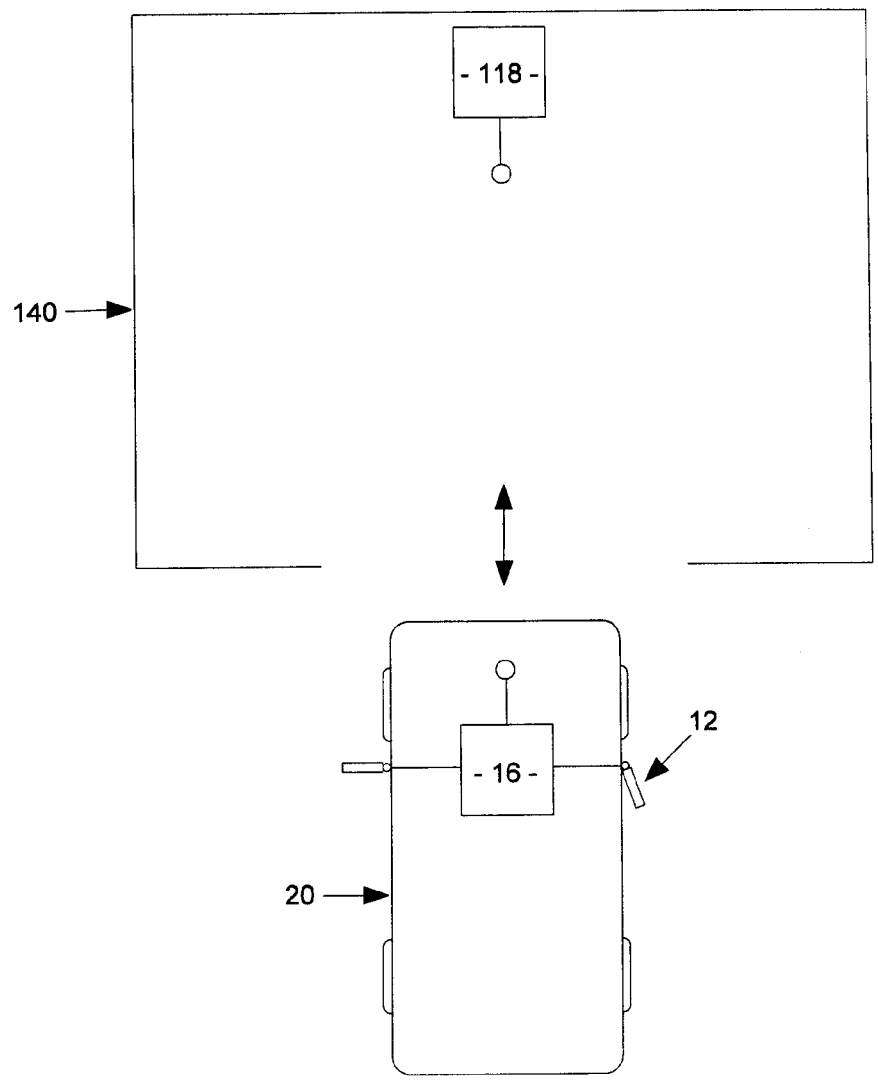
FIG. 4 is a plan view of the system of FIG. 1 in an operational environment, including the vehicle and a garage.

Referring also to FIG. 4, in exemplary use and operation, the system 10 may function substantially as follows. As the vehicle 20, with its mirrors 12 open, approaches a garage 140 in which the remote transmitter 118 is located, the onboard controller 16 receives a signal from the remote transmitter 118 and responds by providing the actuation signal to the motors 14 to substantially automatically move the mirrors 12 to the closed position. If the remote transmitter 118 is not present or not functioning properly, the operator of the vehicle 20 can use the manual switch 34 to cause the mirrors 12 to reposition.

Subsequently, when the vehicle 20, with its mirrors closed, leaves the garage 140 in which the remote transmitter 118 is located, the onboard controller ceases receiving the signal from the remote transmitter 118 and responds by providing the actuation signal to the motors 14 to substantially automatically move the mirrors 12 to the open position. If the remote transmitter 118 is not present or not functioning properly, the operator of the vehicle 20 can use the manual switch 34 to cause the mirrors 12 to reposition.

From the foregoing discussion, it will be appreciated by those with ordinary skill in the art that the system of the present invention provides a number of advantages over the prior art, including substantially automatically positioning the mirrors, rather than relying on the operator to remember to do so, in response to a condition in which the mirrors might be damaged. In turn, this allows for mounting larger mirrors or extension mirrors as needed and without constant fear of damage.

Although the invention has been disclosed with reference to various particular embodiments, it is understood that equivalents may be employed and substitutions made herein without departing from the scope of the invention as recited in the claims. For example, it will be appreciated that various components of the system may be adapted for use on particular makes and models of vehicles.

Having thus described the preferred embodiment of the invention, what is claimed as new and desired to be protected by Letters Patent includes the following:

1. A system comprising:
   a mirror mounted on a vehicle, the mirror being movable between an open position and a closed position;
   a motor operable to, in response to an actuation signal, move the mirror to one of the open and closed positions; and
   an onboard controller operable to substantially automatically provide the actuation signal to the motor in response to the occurrence of an actuation condition,
   wherein the actuation condition is associated with an action normally taken in the ordinary course of operating the vehicle,
   wherein the onboard controller is further operable to substantially automatically provide the actuation signal when the vehicle enters a particular location as determined by global positioning system technology.

2. The system as set forth in claim 1, wherein the mirror is mounted within a housing which includes
   a lower element fixedly mounted to the vehicle; and
   an upper element pivotably associated with the lower element.

3. The system as set forth in claim 1, wherein the action normally taken in the ordinary course of operating the vehicle includes
   a first action associated with beginning operation of the vehicle, indicating that the mirror should be moved to the open position; and
   a second action associated with ending operation of the vehicle, indicating that the mirror should be moved to the closed position.

4. The system as set forth in claim 3, wherein the action normally taken in the ordinary course of operating the vehicle involves inserting or removing a key.

5. The system as set forth in claim 3, wherein the action normally taken in the ordinary course of operating the vehicle involves engaging or disengaging a transmission.

6. The system as set forth in claim 1, further comprising a remote transmitter located in an area of close clearance and operable to provide a signal which causes the onboard controller to provide the actuation signal.

7. The system as set forth in claim 6, wherein the remote transmitter is a short range, directional, continuous transmitter.

8. The system as set forth in claim 6, wherein the remote transmitter is adapted to plug into a common electrical outlet.

9. The system as set forth in claim 6, wherein the remote transmitter includes a pre-settable distance control for controlling the distance from the remote transmitter at which the remote transmitter's signal is receivable by the onboard controller.

10. The system as set forth in claim 1, further including a manually activated switch for causing the onboard controller to provide the actuation signal, the switch having at least three positions, including—
    a position associated with a left minor only;
    a position associated with a right mirror only; and
    a position associated with both the left and rights mirrors.

11. The system as set forth in claim 1, further including a manually activated key fob transmitter for remotely causing the onboard controller to provide the actuation signal.

12. A system comprising:
    a mirror mounted on a vehicle, the mirror being movable between an open position and a closed position;
    a motor operable to, in response to an actuation signal, move the minor to one of the open and closed positions;
    an onboard controller operable to substantially automatically provide the actuation signal to the motor in response to the occurrence of an actuation condition,
    wherein the actuation condition is associated with an action normally taken in the ordinary course of operating the vehicle, including
    a first action associated with beginning operation of the vehicle, indicating that the mirror should be moved to the open position, and a second action associated with ending operation of the vehicle, indicating that the mirror should be moved to the closed position; and a remote transmitter located in an area of close clearance and operable to provide a signal which causes the onboard controller to provide the actuation signal, wherein the remote transmitter is a short range, directional, continuous transmitter, is adapted to plug into a common electrical outlet, and includes a pre-settable distance control for controlling the distance from the remote transmitter at which the remote transmitter's signal is receivable by the onboard controller, wherein the onboard controller is further operable to substantially automatically provide the actuation signal when the vehicle enters a particular location as determined by global positioning system technology.

13. The system as set forth in claim 12, wherein the action normally taken in the ordinary course of operating the vehicle involves inserting or removing a key.

14. The system as set forth in claim 12, wherein the action normally taken in the ordinary course of operating the vehicle involves engaging or disengaging a transmission.

15. A system comprising:

a mirror mounted on a vehicle, the mirror being movable between an open position and a closed position;

a motor operable to, in response to an actuation signal, move the minor to one of the open and closed positions;

an onboard controller operable to substantially automatically provide the actuation signal to the motor in response to the occurrence of an actuation condition, wherein the actuation condition is associated with an action normally taken in the ordinary course of operating the vehicle, including a first action associated with beginning operation of the vehicle, indicating that the mirror should be moved to the open position, and a second action associated with ending operation of the vehicle, indicating that the mirror should be moved to the closed position; and a manually activated switch for causing the onboard controller to provide the actuation signal, the switch having at least three positions, including a position associated with a left minor only, a position associated with a fight mirror only, and a position associated with both the left and fights mirrors, wherein the onboard controller is further operable to substantially automatically provide the actuation signal when the vehicle enters a particular location as determined by global positioning system technology.

16. The system as set forth in claim 15, wherein the action normally taken in the ordinary course of operating the vehicle involves inserting or removing a key.

17. The system as set forth in claim 15, wherein the action normally taken in the ordinary course of operating the vehicle involves engaging or disengaging a transmission.

* * * * *

UNITED STATES PATENT AND TRADEMARK OFFICE
CERTIFICATE OF CORRECTION

PATENT NO.         : 7,474,203 B2                                             Page 1 of 1
APPLICATION NO.    : 11/748693
DATED              : January 6, 2009
INVENTOR(S)        : Kirk B. Urick It is certified that error appears in the above-identified patent and that said Letters Patent is hereby corrected as shown below:

Column 6, line 46, claim 10 delete "minor," and insert --mirror--.

Column 6, line 56, claim 12 delete "minor" and insert --mirror--.

Column 7, line 27, claim 15 delete "minor" and insert --mirror--.

Column 8, line 13, claim 15 delete "minor" and insert --mirror--.

Column 8, line 14, claim 15 delete "fight" and insert --right--.

Column 8, line 15, claim 15 delete "fights" and insert --right--.

Signed and Sealed this

Thirty-first Day of March, 2009

JOHN DOLL
*Acting Director of the United States Patent and Trademark Office*